United States Patent [19]
Käufer et al.

[11] Patent Number: 5,373,956
[45] Date of Patent: Dec. 20, 1994

[54] CASE, IN PARTICULAR CABLE BRANCHING CASE

[75] Inventors: Helmut Käufer, Mettmann; Maximilian Grimm, Hamburg; Polese Angelo, Berlin; Bernd Staudte, Berlin; Detlef Struck, Berlin; Wolfgang Radelow, Berlin; Hans-Joachim Permin, Berlin, all of Germany

[73] Assignee: Krone Aktiengesellschaft, Berlin, Germany

[21] Appl. No.: 22,961

[22] Filed: Feb. 25, 1993

[30] Foreign Application Priority Data

Feb. 29, 1992 [DE] Germany .............. 4206682

[51] Int. Cl.$^5$ .............................. B65D 6/00
[52] U.S. Cl. .................... 220/4.28; 220/4.29; 220/4.26; 220/4.33; 312/257.1
[58] Field of Search ........... 220/4.33, 4.26, 4.28, 220/4.34; 312/257.1, 263, 264; 361/600

[56] References Cited

U.S. PATENT DOCUMENTS

| | | | |
|---|---|---|---|
| 1,883,553 | 10/1932 | Chain | 220/4.34 |
| 3,376,086 | 4/1968 | Fisher | 361/600 X |
| 4,102,557 | 7/1978 | Lee et al. | 220/4.33 X |
| 4,782,972 | 11/1988 | Wenkman et al. | 220/4.28 |
| 4,789,075 | 12/1988 | Sun | 220/4.34 |
| 5,076,454 | 12/1991 | Garton et al. | 220/4.26 |
| 5,259,523 | 11/1993 | Scherb | 220/4.26 |

FOREIGN PATENT DOCUMENTS

| | | |
|---|---|---|
| 2330268 | 5/1975 | Germany . |
| 8436323 | 4/1985 | Germany . |
| 8436325 | 5/1985 | Germany . |
| 3524539A1 | 1/1987 | Germany . |

Primary Examiner—Steven M. Pollard
Attorney, Agent, or Firm—McGlew and Tuttle

[57] ABSTRACT

The invention relates to a case, in particular a cable branching case for receiving and distributing cables, in particular light waveguides, for the telecommunication and for the low-voltage distribution. It is the object of the invention to provide a case of the type referred to hereinbefore, which has a modular design and is sufficiently sealed against the environment, by means of which an uncomplicated and service-friendly operation is guaranteed. For the solution of this object, the invention provides that the side walls of the case are formed of at least two box-type, opposed, L-shaped segments with a groove formed at the one longitudinal edge and a tongue formed at the other longitudinal edge, that the cover and the bottom element contain a groove and a tongue section for connection with the L-shaped segments, and that the L-shaped segments can be connected with the cover and bottom elements such that a movable door side and a fixed rear wall side are formed. Thereby, the size of the case and also the access side can be determined on site (FIG. 2).

17 Claims, 7 Drawing Sheets

CASE, IN PARTICULAR CABLE BRANCHING CASE

FIELD OF THE INVENTION

The invention relates to a case, in particular a cable branching case for receiving and distributing cables. The cables can be such as, light waveguides, telecommunication cables and low-voltage distribution cables.

BACKGROUND OF THE INVENTION

Branching and distributing cable cases of the telecommunication are known in the art. A case of this type is described in De-PS 23 20 268. The cable branching case is made of glass-fiber reinforced plastic or composite material and comprises two side walls, a door, a rear wall, a front door frame and a roof. The components are connected with each other over internal screws. Between a socket and the case, a rack frame is disposed. The door is hinged, on one side, over two swing hinges, and is provided with a doubleside bar slider lock. Sealing is performed over inserted rubber sealing strips and over a sandwich-type design.

It is disadvantageous with this type of design that time-consuming disassembly is necessary if the case has been damaged. Due to the missing repair possibility from the rear, the case is less service-friendly. The case has a high weight and a too high price-to-performance ratio. Further, there is no intended breaking point between the frame and the upper case portion.

In DE-OS 35 24 539, a case is described, which can be split up, in its diagonal, into two portions of nearly identical size. The case can be loosened over lugs from the socket.

In DE-GM 84 36 325 and DE-GM 84 36 323, there are described cable branching cases, which exhibit various door constructions and measures for sealing.

In all prior art cases, in particular cable branching cases, it is disadvantageous, however, that a modular design of the case in defined height units is not possible, so that an undesired empty space will result with partially occupied configurations. All cases are sealed in an insufficient manner and are little service-friendly, since the accessibility of the built-in parts is not sufficient. The cases have, further, no intended breaking points for limiting damage in case of too high forces.

SUMMARY AND OBJECTS OF THE INVENTION

It is therefore the object of the invention to provide a case, in particular a cable branching case, of the type referred to hereinbefore, which has a modular design and is sufficiently sealed against the environment. It is also desired to construct the case by means of which an uncomplicated and service-friendly operation is guaranteed and in which an intended breaking point substantially prevents damage to the case by external forces.

For the solution of this object, the invention provides that the side walls of the case are formed of at least two opposed, L-shaped segments with a groove formed at the one longitudinal edge and a tongue formed at a respectively other longitudinal edge. The bottom element being longitudinally divided and contains on each half, a groove and a tongue section for receiving the L-shaped segments. Thereby, the size of the case and also the access side can be determined on site and can correspond to local operating conditions. Depending on how the L-shaped segments are brought onto the bottom element, there will result a fixed rear wall side and a movable door side. By the fixed mounting of the bottom element on the socket, the fixed rear wall side is achieved on the bottom element half with predominant groove formation, and the movable door side is achieved on the bottom element half with predominant tongue formation. All L-shaped segments are designed such that they can be connected with each other in any configuration over the groove-and-tongue system. The cover element is connected, over a groove-and-tongue section, with the fixed rear wall side and with the movable door side.

Further advantageous embodiments of the invention are defined in the further subclaims.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
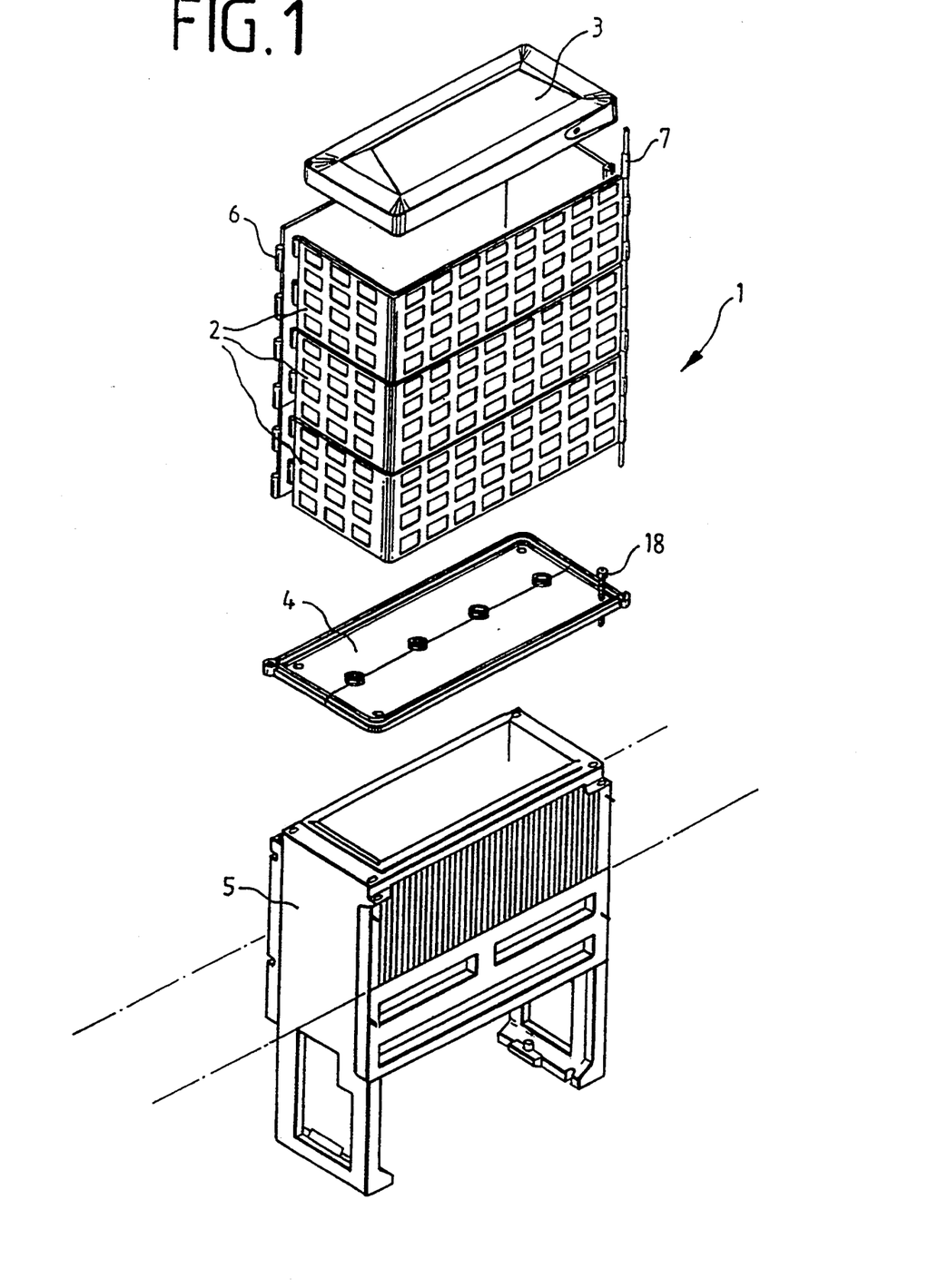
FIG. 1 is a perspective view of the cable branching case with a standard socket in an exploded view.
Figure 2:
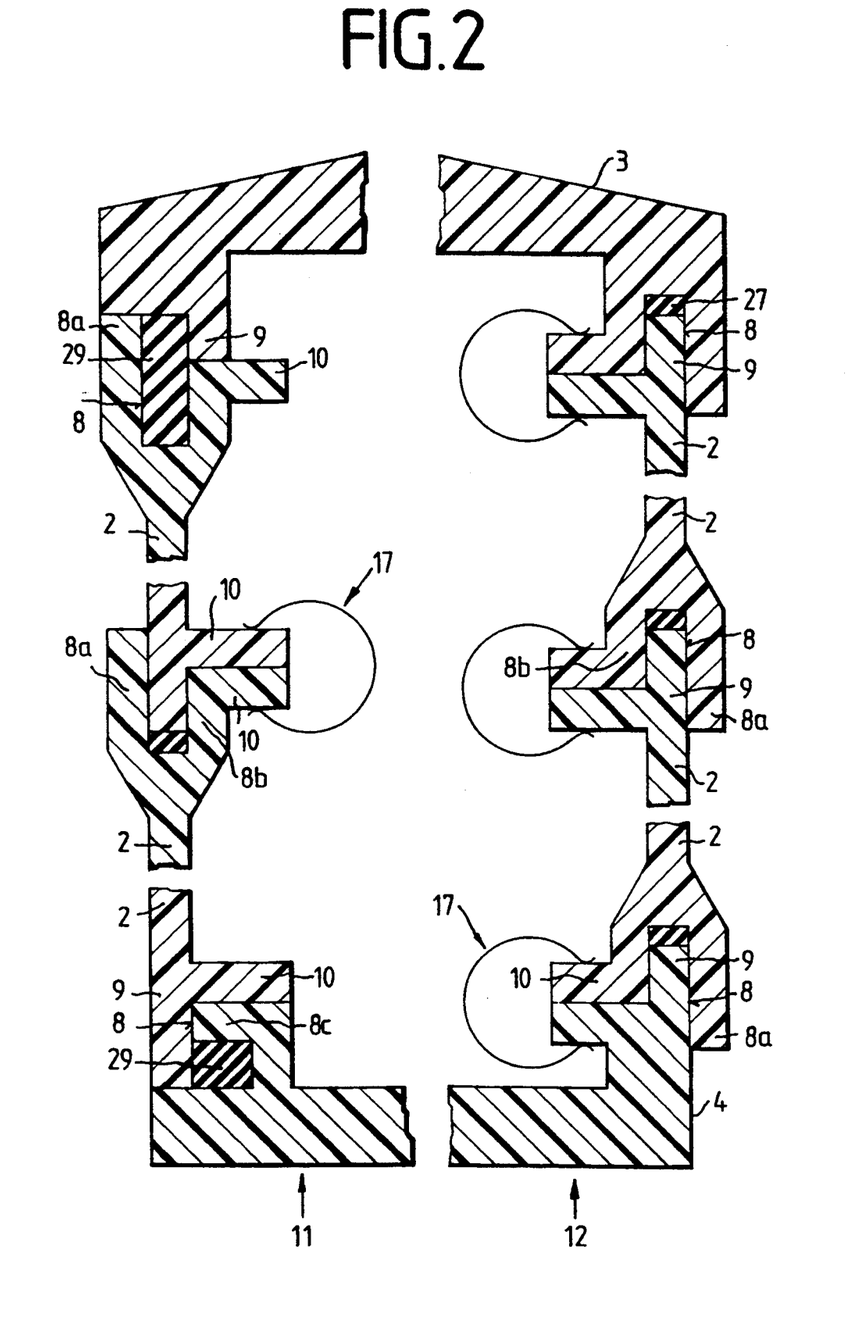
FIG. 2 is a vertical section of the cable branching case.

The cable branching case 1 comprises several L-shaped elements 2 with first and second panels forming separate legs of each L-shaped element or section; a cover element 3 and a bottom element 4, and is completed by a socket 5 formed of standard parts with a foot portion made from concrete or plastic and inserted into the floor (FIG. 1). The individual components of the case 1 are connected with each other over a grooveand-tongue system 8, 9 having connecting and fixing functions as well as sealing functions (FIG. 2).

Figures 3, 4, 5, 6:
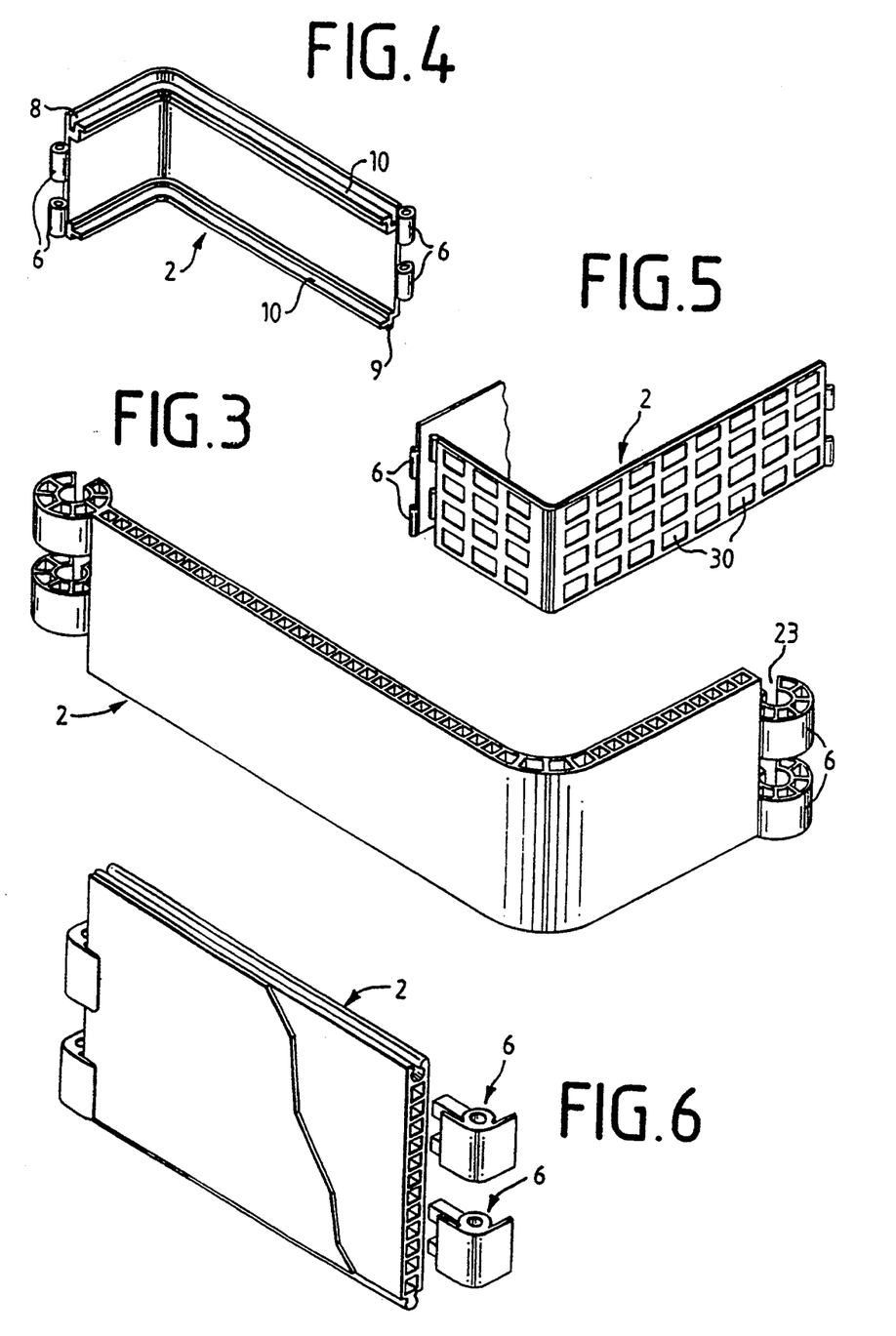
FIG. 3 is a perspective view of an L-shaped segment.
FIG. 4 is a perspective internal view of an L-shaped segment.
FIG. 5 is a perspective external view of a structured L-shaped segment.
FIG. 6 is a perspective view of an L-shaped segment with plug-in elements.
Figure 7:
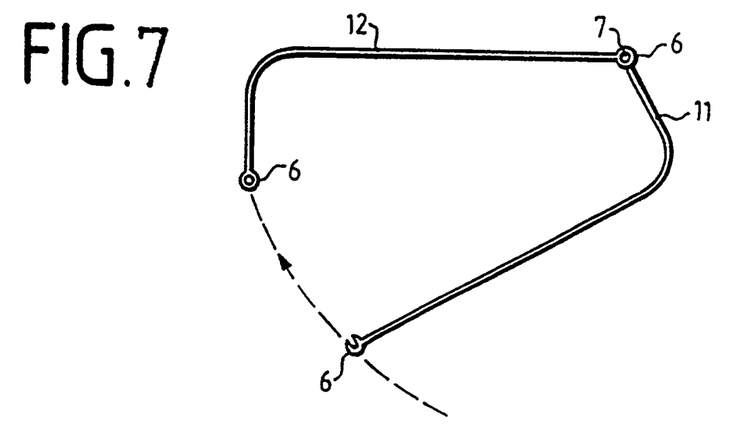
FIG. 7 is a schematic top view of two L-shaped segments with right-hinged door.

The L-shaped segments 2 are connected with each other and with the cover element 3 and the bottom element 4 over a closing system formed of cylinder segments 6 and respective hinge bars 7 (FIGS. 7 to 10). The individual segments 2 disposed vertically on top of each other of the case 2 are pressed together by connecting elements or means 17 in the form of spring rings (FIG. 2). The selected closing system permits, in conjunction with the groove-and-tongue system 8, 9, that the case 1 is adapted, at the installation site, to meet the conditions existing there, with respect to accessibility, size and general service conditions. The movable door side 11 and the fixed rear side 12 can freely be determined, at the installation side. The modular design and the flexible selection of design of the case 1 result, among other reasons, from the constructional design of the L-shaped segments 2. From the representation in FIGS. 3 to 6, it is obvious that each of the L-shaped segments 2 have, at their upper and lower longitudinal edges, a groove 8 or a tongue 9, in order to prevent horizontal (lateral) displacement of the segments 2. The groove 8 is formed such that the groove leg 8a forming each a wall section of the segment 2, is longer than the internal groove leg 8b (FIG. 2). The rigid connection between the segments 2 in the vertical plane is generated by horizontal connection ribs 10 provided at the grooves 8 and at the tongues 9 (FIG. 4). These are placed parallely on top of each other when plugging two segments 2 together, and are at a substantially right angle to the segment wall. When assembling, the connecting elements 17, in the form of spring rings, snap over the connection ribs 10, and the connecting elements 17 prevent the segments 2 from moving away from each other (FIG. 2).

Figure 15:
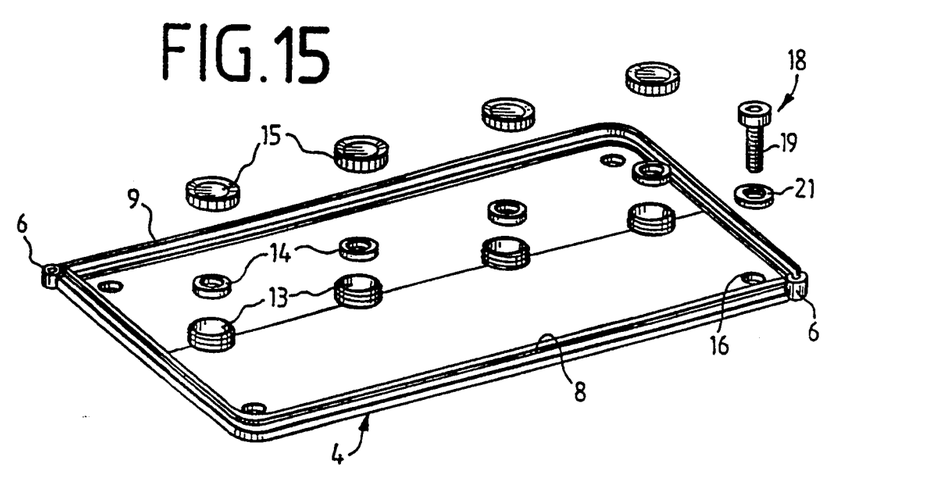
FIG. 15 is a perspective view of the bottom element.

Such a groove-and-tongue system 8, 9 further comprises, a longitudinally divided bottom element 4. Each half of bottom element 4 includes a groove as well as a tongue 8 or 9, resp. (FIG. 15). In the halves of the bottom element 4, one half has the groove 8 being predominate and the other half has the tongue 9 being predominant. The groove 8 of the half of the bottom element 4 with the predominant groove structure is forwardly open and contains a bottom groove leg 8c. This groove 8 and the tongue 9 of a corresponding segment 2 form a fitting edge. This fitting edge is sealed by means of a sealing rubber grommet 29 against external influences. The tongue 9 of the half of the bottom element 4 with the predominant tongue structure is formed like a tongue 9 of the segment 2 and engages into the groove 8 of the segment 2 arranged on top thereof. The half of the bottom element 4 with the predominant groove structure receives the fixed rear wall 12. The half of the bottom element 4 with predominant tongue structure receives the movable door side 11 (FIG. 2). The two halves of the bottom element 4 are connected with each other over connecting elements, e.g. over non-shown pins and grooves.

Figure 16:
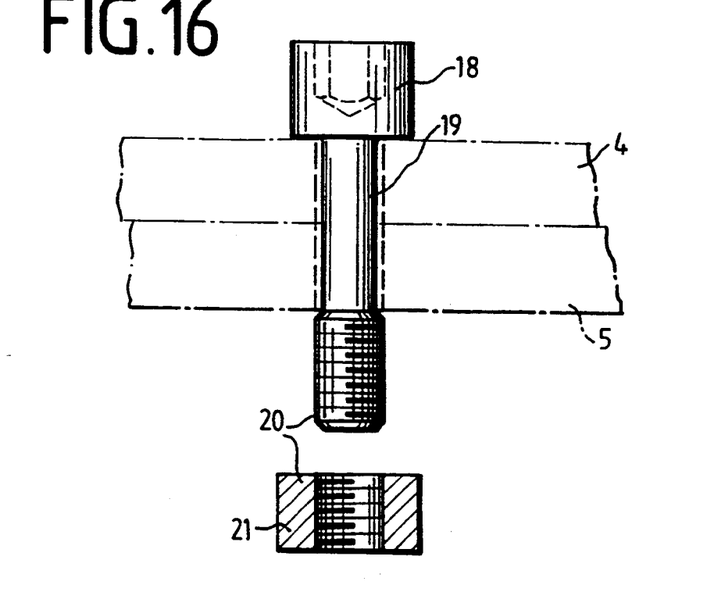
FIG. 16 is a sectional view of the intended breaking section.
Figure 17:
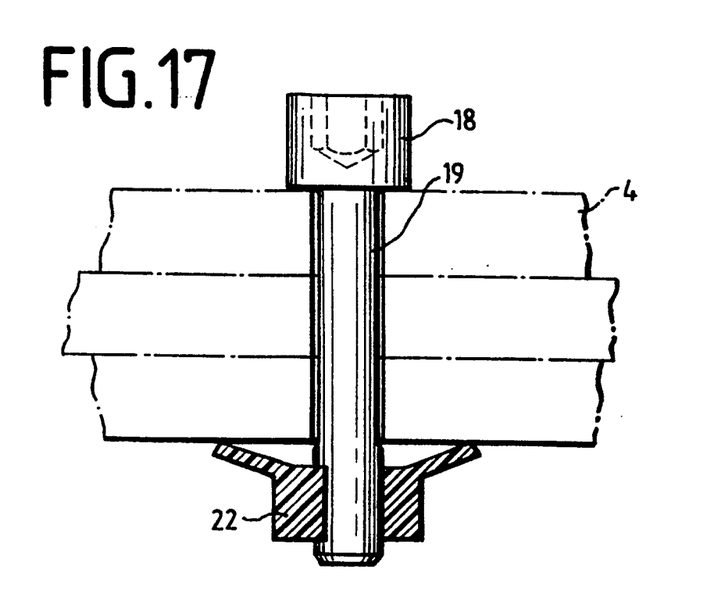
FIG. 17 is a sectional view of another intended breaking element.

The cable passages are formed by divided threaded ports 13 having a tapered entry portion. A slotted sealing rubber grommet 14 serves for sealing. A closing ring 15, which opens radially serves for closing and tightening. In the four corners of the bottom element 4, the non-shown bearings for the hinge bars 7 are disposed. Bottom boreholes 16 are provided serving for fixing the case 1 over the bottom element 4 and to the standard socket 5 with the frame. Connection of the case 1 over the bottom element 4 with the socket 5 and with frame is preformed over breaking elements 18. By means of the breaking elements 18 a rigid, but loosenable connection is achieved. This connection will break in case of critical load, in order to avoid damage of the case 1 and/or of the socket 5. The intended breaking element 18 comprises a pin 19 made of plastic, and a closing piece 20, which is formed of a threaded section on the pin 19 and of a nut 21 or of a quick-close member 22 (FIGS. 16, 17). The intended breaking element 18 can easily be replaced.

Figures 8, 9:
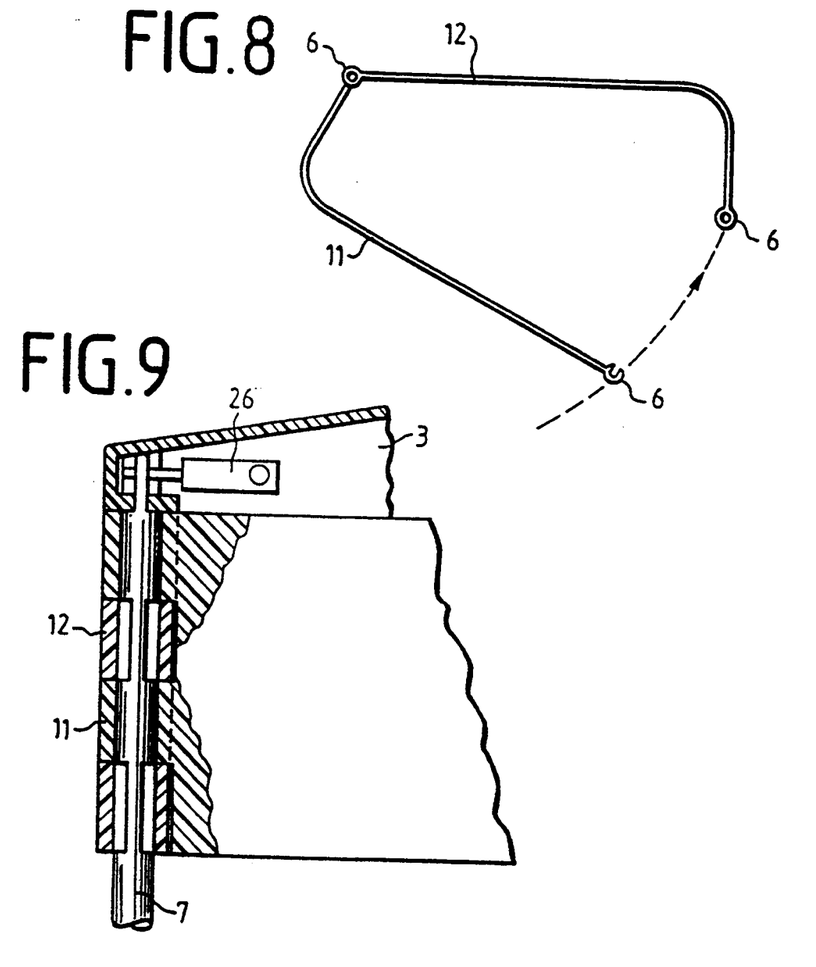
FIG. 8 is a schematic top view of two L-shaped segments with left-hinged door.
FIG. 9 a sectional view of the closing elements in the rotational area of the case.
Figure 10:
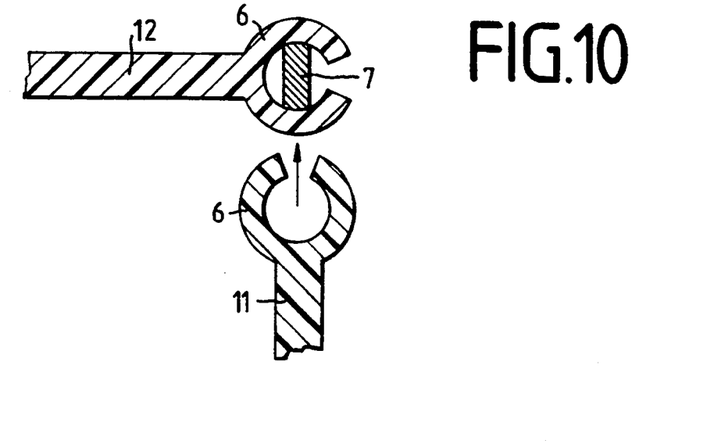
FIG. 10 is a top view of a cylinder segment with a hinge bar in open condition.
Figure 11:
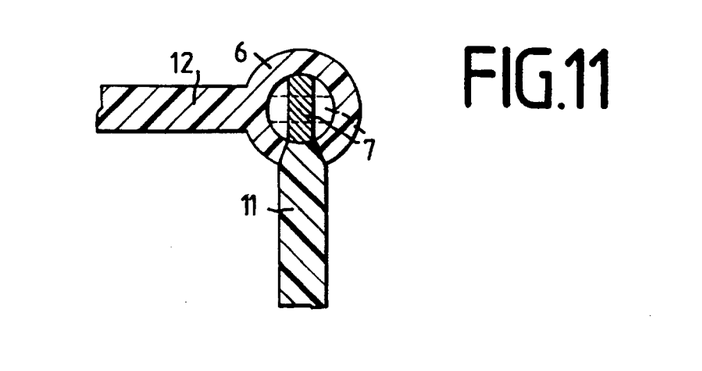
FIG. 11 is a top view of the cylinder segment with a hinge bar in closed condition.
Figure 12:
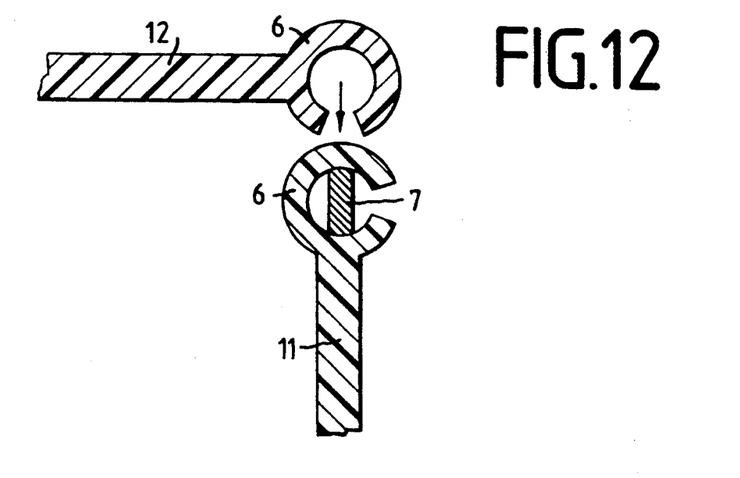
FIG. 12 is a top view of a cylinder segment with a hinge bar in open condition in another embodiment.
Figure 13:
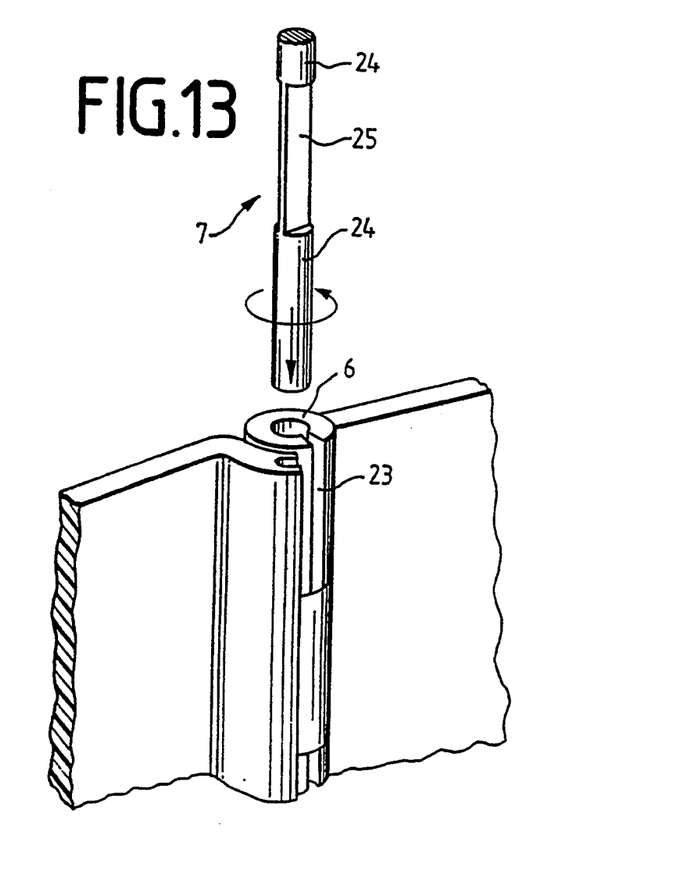
FIG. 13 is a perspective view of several cylinder segments and of the hinge bar.
Figure 14:
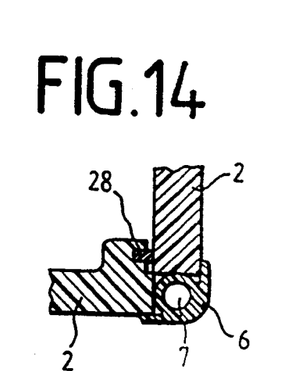
FIG. 14 is a sectional view of the hinge section.

The movable connection of the L-shaped segments 2 is achieved by the closing system. As is shown in FIGS. 3 and 7 to 13, there are disposed, on the two narrow sides of the L-shaped segments 2, two cylinder segments 6 asymmetrically vertically on top of each other, so that when assembling two segments 2, they will vertically engage with each other (FIGS. 3 and 5). The cylinder segments 6 can also be adapted as plug-in elements (FIG. 6). A hinge bar 7 is guided through an internal borehole defined by the toothed cylinder segments 6. This prevents horizontal displacement of the segments 2. For closing or fixing, resp., the segments 2, the cylinder segments 6 are adapted, in conjunction with the hinge bar 7, as a hinge lock (FIGS. 9 to 12). For this purpose, the cylinder segments 6 are provided with a longitudinal through-slot 23. The width of the through-slot 23 is smaller than the borehole diameter of the cylinder segment 6 and conically opens towards the front (FIGS. 3 and 10 to 12). The longitudinal slots 23 are alternatively disposed at the cylinder segments 6 such that they are located on the side of the long leg of the L-shaped segments 2, internally and vertically to the side wall, and also located on the side of the short leg of the L-shaped segments, frontally vertically in a parallel extension to the side wall. The hinge bar 7 is formed in the same interval as the arrangement of the cylinder segments 6, as a cylindrical bar section 24 and as a rectangular bar section 25 (FIG. 13). The dimensions of the rectangular profile of the rectangular bar section 25 of the hinge bar 7 correspond to the borehole diameter of the cylinder segment 6 and to the width of the longitudinal slot 23. When closing, the cylinder segments 6 engage with each other. The hinge bar 7 has its cylindrical bar sections 24 in the boreholes of one part of the cylinder segments 6, and the rectangular bar sections 25 are guided in the longitudinal slots 23 of the opposed remaining cylinder segments 6. By rotating the hinge bar 7 by, e.g. 90°, a positive mechanical linkage is achieved, and the closing elements (cylinder segments 6 and hinge bar 7) lock the hinge (FIG. 11). The hinge bar 7 is guided in the bottom element 4 and in the cover element 3. The mechanism for rotating the hinge bar 7 is provided in the cover element 3, as is shown in FIG. 9, and comprises a lever with a lock cylinder 26 being mechanically linked with the hinge bar 7.

The cover element 3 serving as a roof is formed tapered, as shown in FIG. 1, in order to prevent climbing up or sitting down and to assist in guiding rainwater down. The cover element 3 may, however, also include a spherical arch or an inclined roof portion forming an angle between 90° and 170°.

The required sealing of the case 1 is achieved by the groove-and-tongue system 8, 9 described above, and by including profiled seals 27. Sealing in the groove-and-tongue sections is achieved by a circumferential sealing rubber grommet or by a sealing compound (FIG. 2). In the hinge area, sealing is achieved by a rubber hinge seal 28 in a longitudinally extending groove profile, as is shown in FIG. 11. The door seals at the roof fitting edge (FIGS. 2, 9) is achieved over a roof sealing rubber grommet 29 provided in a groove. The cover element 3 comprises, on the door side 11, a tongue 9. This tongue 9, the sealing rubber grommet 29 provided in the groove 8 of the segment 2 arranged therebelow, and the longer leg 8a of the groove 8 of the segment 2, combine to form a sealed fitting edge. In the rear wall area, the cover element 3 is provided with a groove 8 having the dimension of the grooves 8 of the segments 2. Into this groove 8 the tongue 9 of the segment 2 is arranged therebelow.

The same method of sealing is employed for the door sealing in the bottom element 4.

The employed material for the case 1 depends on the method of manufacturing, environmental protection considerations (recycling capability), the required heat insulation, and weight. For manufacturing the L-shaped segments 2, the following material combinations are therefore recommended:

1. Zinc-plated sheet-steel of 0.8 mm thickness, stiffened by corrugations
2. Web-plate design of PP or PC with a thickness of 10 mm and external plates of stainless steel 0.3 to 0.5 mm
3. Sandwich design with stainless steel and foam core (PC, glass foam)
4. Thermoplastic injection molding with PC, thickness 0.8 mm
5. Two-shell design with hollow-chamber elements, PP injection molding In the preferred embodiment, the segments 2 are made from thermoplastic molded parts, and are stabilized by stiffening corrugations 30 or stiffening ribs 31, as is shown in FIGS. 2 and 5. Such stiffening elements 30 may have various geometrical shapes.

In the case 1, a non-shown jumper frame is provided, consisting of a height-adjustable profiled sheet portal and optionally of horizontal as well as vertical cross webs. By the portal design, the included components are accessible from front and from rear.

While specific embodiments of the invention have been shown and described in detail to illustrate the application of the principles of the invention, it will be understood that the invention may be embodied otherwise without departing from such principles.

What is claimed is:

1. A case comprising:
a bottom element having a groove section and a tongue section;
a first L-shaped section forming a set of side walls of the case, said first L-shaped section having one longitudinal edge forming a tongue and another longitudinal edge defining a groove, said first L-shaped section being rigidly connected to said bottom element by one of said tongue and groove;
a cover element having a groove section and a tongue section, said cover element being rigidly connected to said first L-shaped section by one of said tongue and groove;
a second L-shaped section forming another set of side walls of the case, said second L-shaped section having one longitudinal edge forming a tongue and another longitudinal edge defining a groove, said second L-shaped section being movably connected to said first L-shaped section, said cover element and said bottom element to form a movable door side.

2. A case in accordance with claim 1, further comprising:
a plurality of first L-shaped sections and second L-shaped sections, where said first L-shaped sections are positioned with all longitudinal edges of said first L-shaped sections being substantially in a plane and said second L-shaped sections are positioned with all longitudinal edges of said second L-shaped sections being substantially in a plane, said longitudinal edges of said first L-shaped sections and said second L-shaped sections having connection section ribs extending substantially perpendicular to a surface of a respective first L-shaped section and second L-shaped section, said connection ribs of adjacent first L-shaped sections and second L-shaped sections being positioned adjacent when said first and second L-shape sections are connected together by the longitudinal edges; and
said longitudinal edges of said first L-shaped sections and second L-shaped sections which defines said groove having a first leg adjacent said connection rib and a second leg positioned on an opposite side of said groove from said first leg, said second leg extending farther from said respective L-shaped section than said first leg extends from said respective L-shaped section.

3. A case in accordance with claim 2, further comprising:
a connecting means for forcing said adjacent connection ribs together.

4. A case in accordance with claim 1, wherein:
said tongue section of said bottom element engages with said groove section of said first L-shaped section and said tongue of said first L-shaped section engages with said groove section of said cover element;
said groove section of said bottom element is open outwardly and contains a first sealing grommet as well as a bottom groove leg; and
said tongue of said second L-shaped section unites with both said first sealing grommet and said bottom groove leg of said groove section of said bottom element, said second L-shape section including a connection rib positioned adjacent said tongue and also uniting with said bottom groove leg, said longitudinal edge of said second L-shaped section which defines said groove has a first leg on one side of said groove and a second leg positioned on another side of said groove opposite from said first leg, said second leg extending longer from said second L-shape section than said first leg extending from said second L-shape section, said groove containing a second sealing grommet, said second leg and said second sealing grommet uniting with said tongue section of said cover element.

5. A case in accordance with claim 1, wherein:
said first L-shaped section and said second L-shaped section have lateral edges and include cylinder segments, said cylinder segments being positioned to engage with one another when said first L-shaped section and said second L-shaped section are combined to form the sides of the case; and
a hinge bar is positioned in said cylinder segments and integrated in said cover and bottom elements.

6. A case in accordance with claim 5, wherein:
said cylinder segments are plug-in elements and are insertable into said lateral edges of said first L-shaped section and second L-shaped section.

7. A case in accordance with claim 5, wherein:
said cylinder segments define a borehole and longitudinal through-slots, a width of said through-slots being smaller than a diameter of said borehole, said through-slots opening towards said cylinder segments of the other L-shaped section;
said hinge bar has a cylindrical section and a rectangular bar section in an area of said cylinder segments, said rectangular bar section has a first dimension substantially equal to said borehole diameter and a second dimension substantially equal to said width of said through-slot;
lock means is positioned in said cover element and connected to said hinge bar, said locking means rotating and locking said hinge bar.

8. A case in accordance with claim 5, further comprising:
a plurality of first L-shaped sections and second L-shaped sections, where said first L-shaped sections and said second L-shaped sections are positioned substantially parallely on top of each other and are connected to each other by said tongues and grooves of each L-shaped section, and by said cylinder segments with said hinge bar.

9. A case in accordance with claim 5, further comprising:
profile seals in said grooves of said first L-shaped section and said second L-shaped section; and
hinge seal means for sealing between said first L-shaped section and said second L-shaped section in a hinge area where said first L-shaped section pivotably connects with said second L-shaped section.

10. A case in accordance with claim 1, wherein:
said grooves and tongues of said first L-shaped section and said second L-shaped section are formed as a groove-and-tongue plug-in system.

11. A case in accordance with claim 1, wherein:
said first and second L-shaped segments have stiffening corrugations and stiffening ribs.

12. A case in accordance with claim 1, wherein:
said first and second L-shaped segments are manufactured from polycarbonate, SMC or thermoset material in double-web plates designed with sandwich construction and including glass foam segments and plastic honeycomb-profile plates.

13. A case in accordance with claim 1, wherein:
metal profiles are molded into said first and second L-shaped segments, and an external metal cover having a thickness between 0.2 and 0.5 mm, is applied and provided with one of an environmentally resistant paint and a plastic coating.

14. A case in accordance with claim 1, further comprising:
a standard socket for supporting said bottom element;
breaking means for fixing said bottom element to said standard socket and for breaking said bottom element away from said standard socket when said bottom element receives a force exceeding a predetermined value; and
bottom bore holes defined by said bottom element for receiving said breaking means.

15. A case in accordance with claim 14, wherein:
said breaking means includes a plastic pin and a height-adjustable closing piece.

16. A case in accordance with claim 15, wherein:
said closing piece includes a thread formed on said plastic pin and one of a nut and a quick-close member.

17. A case in accordance with claim 1, further comprising:
a plurality of first L-shaped sections and second L-shaped sections, each of said first and second L-shaped sections having a first panel forming one leg of said each L-shaped section and a second panel forming another leg of said each L-shaped section, said first L-shaped sections are connected substantially in line with all said first panels being substantially in a first plane and said second panels being substantially in another first plane, said second L-shaped sections are connected substantially in line with all said first panels being substantially in a second plane and said second panels being substantially in another second plane, said longitudinal edges of said first L-shaped sections and said second L-shaped sections having connection ribs extending substantially perpendicular to a surface of a respective first L-shaped section and second L-shaped section, said connection ribs of adjacent first L-shaped sections and second L-shaped sections being positioned adjacent each other when said L-shaped sections are connected in line; and
said groove defined by said longitudinal edges of said first L-shaped sections and second L-shaped sections having a first leg adjacent said connection rib and a second leg positioned on an opposite side of said groove from said first leg, said second leg having a length longer than a length of said first leg.

* * * * *